United States Patent [19]
Stankowski et al.

[11] Patent Number: 5,674,395
[45] Date of Patent: Oct. 7, 1997

[54] MULTIPLE SAMPLE SEPARATOR

[75] Inventors: Ralph Stankowski, Westford; Phillip Clark, Wakefield; Sandra Katz, North Reading; George A. Gagne, Dracut, all of Mass.

[73] Assignee: Millipore Corporation, Bedford, Mass.

[21] Appl. No.: 461,481

[22] Filed: Jun. 5, 1995

[51] Int. Cl.⁶ .................................................. B01D 63/00
[52] U.S. Cl. .......................... 210/321.75; 210/321.84; 210/474; 210/484; 422/101
[58] Field of Search .................. 210/295, 321.75, 210/321.84, 253, 407, 360.1, 380.1, 451, 458, 473, 474, 767, 484; 422/101; 356/246

[56] References Cited

U.S. PATENT DOCUMENTS

| | | | |
|---|---|---|---|
| 3,488,768 | 1/1970 | Rigopulos | 210/781 |
| 4,828,386 | 5/1989 | Matkovich et al. | 356/246 |
| 5,026,649 | 6/1991 | Lyman et al. | 422/101 |
| 5,116,496 | 5/1992 | Scott | 422/101 |
| 5,147,606 | 9/1992 | Charlton et al. | 210/101 |
| 5,176,825 | 1/1993 | Hadjis et al. | 210/360.1 |
| 5,223,133 | 6/1993 | Clark et al. | 210/321.84 |
| 5,227,290 | 7/1993 | Pocock | 422/101 |
| 5,283,039 | 2/1994 | Hysta | 422/101 |
| 5,462,874 | 10/1995 | Wolf et al. | 422/101 |

*Primary Examiner*—Ana Fortuna
*Attorney, Agent, or Firm*—Paul J. Cook; John Dana Hubbard

[57] ABSTRACT

A multiwell filtration device having at least two liquid receiving reservoirs is disclosed in which at least one of the side walls includes one or more openings for passing liquid therethrough. A filtration membrane is sealingly adhered to the side wall covering the openings of each reservoir. The reservoirs are adapted to be positioned within the wells of a multiwell plate, which receives the filtrate passing from the reservoir through the membranes. The desired orientation of the reservoirs in the multiwell plate is retained before, during or after filtration to promote efficient automated sample handling techniques.

25 Claims, 4 Drawing Sheets

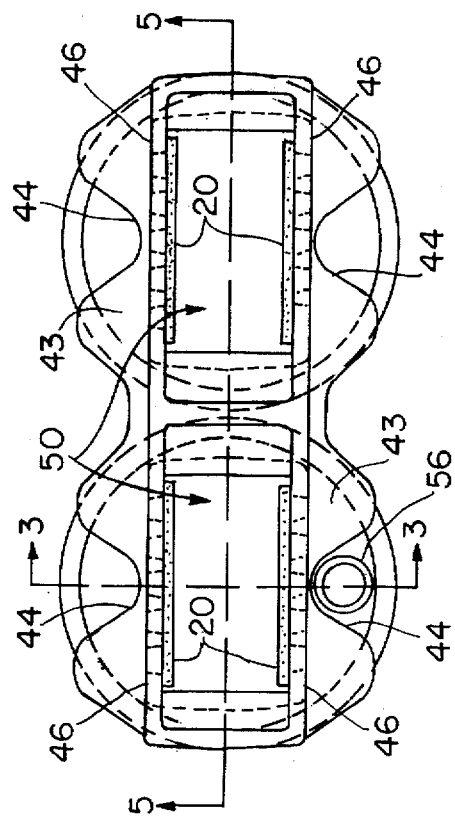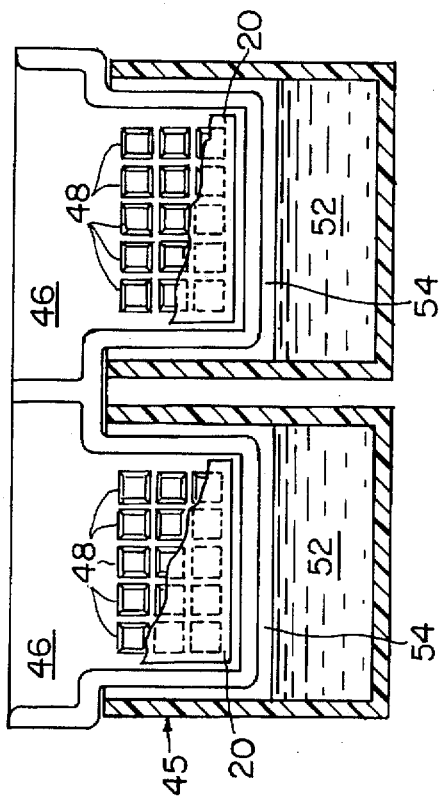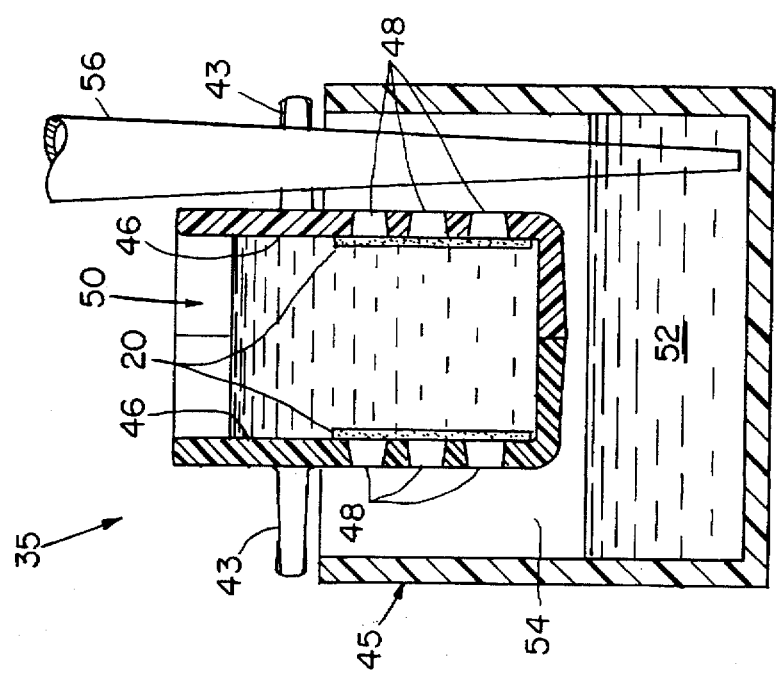

MULTIPLE SAMPLE SEPARATOR

BACKGROUND OF THE INVENTION

This invention relates to a method and apparatus for filtering liquid samples suitable for use in a centrifugation system.

When filtering a liquid sample utilizing a filtration membrane, plugging and fouling of the membrane adversely affects processing speed and quality of sample separation. The time needed to separate filtrate from retentate is undesirably increased when a layer of concentrated components of the sample forms on the membrane surface since flow through the membrane is restricted. This component concentration increase at the membrane surface can itself act as a filtration volume and restrict passage of components through the filter which otherwise would pass through the filtration membrane. This undesirable effect is commonly encountered during dead end filtration.

In order to alleviate the problems associated with concentrated component layers on a filtration membrane surface, it has been proposed to effect filtration at an angle to the direction of gravitational force effected, for example, by centrifugation. By operating a filtration process in this manner, components of the sample which can cause the formation of the concentration layer are concentrated away from the membrane surface through which fluid flow is substantially unimpeded. It has been proposed to provide apparatus suitable for use in a centrifugation device for filtering a liquid sample in U.S. Pat. Nos. 3,488,768; 4,632,761; 4,755,301 and 4,769,145.

These apparatus are suitable for concentrating small volumes of macromolecules in the retentate when utilizing an ultrafiltration membrane. Filtration is terminated before dryness of the sample is achieved so that the concentrated macromolecules remain in solution to facilitate retrieval of the retentate for further processing or analysis. Means are also provided in U.S. Pat. No. 4,755,301 to permit pipetting of the retentate while minimizing the possibility of physical damage to the filter. The apparatus disclosed in this patent is suitable for isolating components from a single sample and is not suitable for isolating multiple samples at the same time. Thus, when a multiplicity of samples are to be analyzed, manual manipulation of the single sample devices becomes undesirably excessive.

U.S. Pat. No. 4,817,379 discloses an ultrafiltration device for concentrating a liquid sample. The device is designed to avoid the need for centrifugation to concentrate a sample. Liquid migration from the discrete chamber of the device through a membrane and into the interior of the device is effected by capillary action through a layer of solid absorbent material housed within the device and in contact with one or two filtration membranes. Since filtrate is retained with the solid absorbent material, it is difficult, at best, to effect its analysis. In addition, the use of the solid absorbent effects undesirable retention of components which would normally be found in the filtrate as would be the case if procedures wherein the sample is filtered without the use of an absorbent material were used.

Accordingly, it would be desirable to provide a device which permits separation of a plurality of samples into a filtrate and retentate without the need for a solid material for effecting liquid flow. In addition, it would be desirable to provide such a device which permits processing a plurality of samples simultaneously. Furthermore, it would be desirable to provide such a device which substantially minimizes or prevents damaging of a filtration membrane in the device during recovery of retentate or filtrate. Still further, it would be desirable if such a device would provide for access to the filtrate or the retentate without requiring disassembly.

SUMMARY OF THE INVENTION

This invention provides a multiwell filtration device which includes at least two liquid receiving reservoirs each having at least one side wall having one or more openings therethrough. A filtration membrane is adhered to each reservoir to seal each opening. Thus the liquid in each reservoir must pass through the membrane prior to being collected in a corresponding well. The reservoirs are sized so that they can be placed within wells of a multiwell plate adapted to receive the filtrate which passes through each membrane. In accordance with a preferred embodiment, the filtration device of this invention is formed by joining two complementary reservoir sections, or a reservoir section and a complementary plate, after the filtration membranes have been sealed over the holes in the reservoir walls. Sealing of the membranes at the desired position when the reservoir is formed from two reservoir sections is greatly facilitated as compared to membrane placement when the reservoir is formed of a single piece since the surface to which the membrane is sealed is more accessible. By positioning the membrane or membranes on a side wall of the reservoir rather than at the bottom of the reservoir increased filtration area per unit well volume becomes available which, in turn, permits shorter required filtration times. At least two reservoirs are joined together in order to facilitate manipulation of the reservoirs into and away from the multiwell plate. Furthermore, by joining at least two reservoirs together, the reservoirs can be suspended within the wells of a standard microtiter plate while retaining desired orientation of the reservoirs within the wells which promotes automated and efficient handling of the samples using standardized automated pipetting procedures.

BRIEF DESCRIPTION OF THE DRAWINGS

FIG. 3 is a cross-sectional view of a reservoir of the invention when filtrate is being pipetted.

FIG. 4 is a top view of the reservoirs of this invention positioned within a multiwell plate.

FIG. 5 is a cross-sectional view of FIG. 4 taken along 5—5.

DESCRIPTION OF SPECIFIC EMBODIMENTS

The multi-reservoir construction of this invention is formed from reservoirs having an open top, a closed bottom, or no bottom, and a plurality of side walls wherein at least one side wall has at least one hole. Each side wall hole is covered by a filtration membrane. The multi-reservoir construction is adapted to fit into a multiwell plate so that when exposed to pressure forces such as those derived from centrifugation, the desired orientation of the reservoir can be maintained. The multi-reservoir construction permits the use of automated sampling of retentate within the reservoir and of filtrate within the wells of the multiwell plate by virtue of its constant orientation, before, during and after filtration from the reservoir is effected without disassembling either the multi-reservoir or the multiwell plate. In addition, the multi-reservoir construction of this invention significantly reduces the handling requirements of retentate samples as compared with constructions which house only a single sample.

The multi-reservoir construction of this invention can be provided with side walls with holes which are vertical, angled from the direction of filtration force, such as gravity, and/or angled relative to a vertical axis through the reservoir from the top open surface to the reservoir bottom. Alternatively, the angled side walls can converge to join together without forming a bottom surface. The common design feature is to orient the membrane over the side wall holes so as to prevent the formation of a retentate concentration barrier on the membrane which will significantly inhibit filtration. In addition, the reservoirs are constructed to permit ease of sealing the filtration membrane over the holes of the side walls without damaging the membrane and while maintaining the integrity of the reservoir against undesirable leaking.

Figure 1:
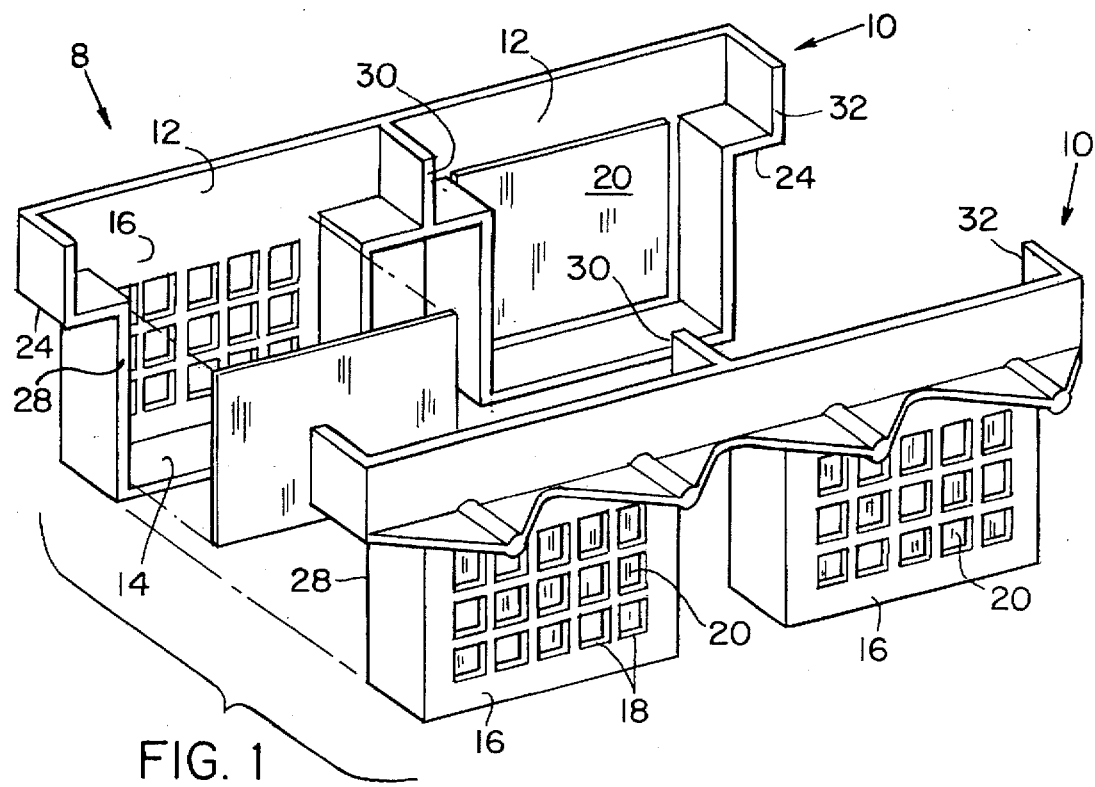
FIG. 1 is a perspective view of two reservoir sections prior to being joined to form the reservoir construction of this invention.

Referring to FIG. 1, the multi-reservoir device 8 is formed from two complementary reservoir sections 10 as shown. Each reservoir section 10 includes an open top 12, a closed bottom 14, and two side walls 16 having openings 18. A filtration membrane 20 is sealed to an inside surface of the side wall 16 to effect liquid flow from the interior of the reservoir section 16, through the membrane 20 and then through the holes 18. The reservoirs 8 are provided with supports 24 which are sized to permit the reservoirs to be suspended by top surfaces of a well of a multiwell plate (See FIG. 4). The reservoir sections 10 are joined together at complementary surfaces 28, 30 and 32 by any conventional means such as by solvent bonding, vibrational bonding, ultrasonic bonding or fusion bonding.

Figure 2:
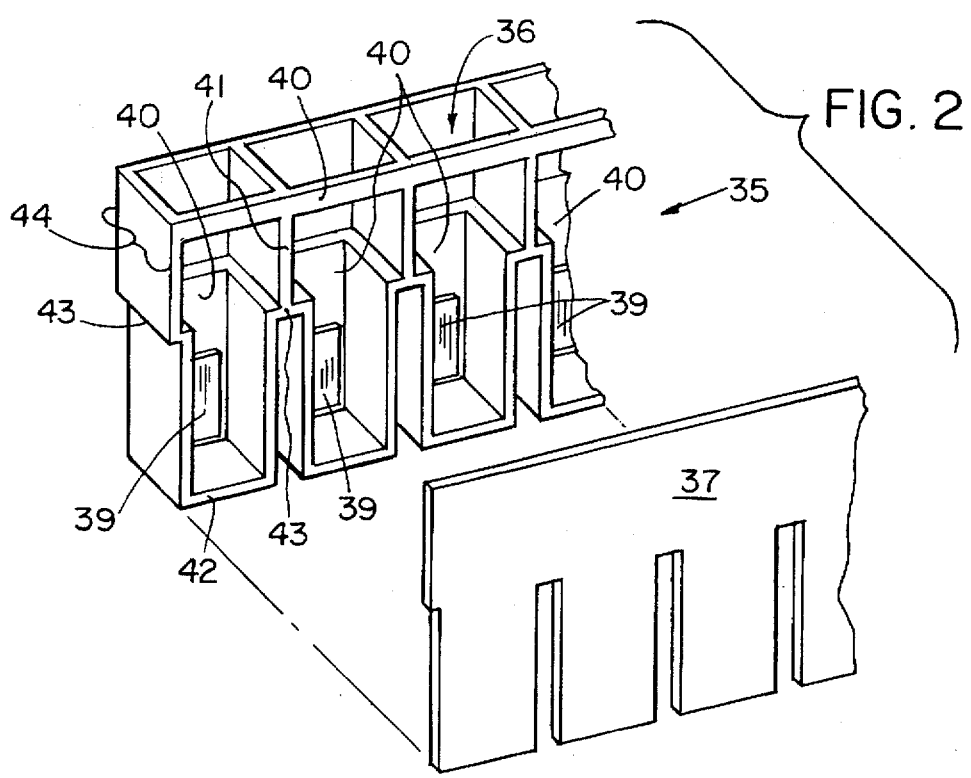
FIG. 2 is an alternative embodiment of this invention formed from one reservoir section and a flat complementary plate.

Referring to FIG. 2, a multi-reservoir device 35 is shown which is formed from a reservoir section 36 and a complementary back plate 37. The membranes 39 are sealed over holes (not shown) through side walls 40. The proper positioning and sealing of the membranes 39 is facilitated prior to sealing the plate 37 to the reservoir section surfaces 41, 42 and 43. The flanges 43 facilitate positioning the multi-reservoir device 35 in a multiwell plate while maintaining its orientation within the plate. An indentation 44 (FIGS. 3 and 4) in each of the flanges permits pipetting the filtrate from the wells of the multiwell plate in an automated manner since the orientation of the indentation 44 remains constant prior to, during and subsequent to filtration such as by centrifugation or under pressure.

Referring to FIGS. 3, 4, and 5, the multi-reservoir device 35 of this invention is shown in position within a multiwell plate 45. Membranes 20 are sealed to the interior surface of side walls 46 so that all liquid passing through the holes 48 from the interior of reservoirs 50 must first pass through membranes 20. The filtrate 52 obtained thereby is retained within wells 54 of multiwell plate 45. The flanges 43 provide a means for maintaining the position of the indentation 44 in the flanges 43. The indentation 44 provides a means for inserting a pipette 56 into the filtrate 52 using conventional automated pipetting means. The use of automated pipetting means is made possible by virtue of the fact that the position of the indentation 44 accommodating the pipettes 56 remains unchanged during sample processing.

Figure 6:
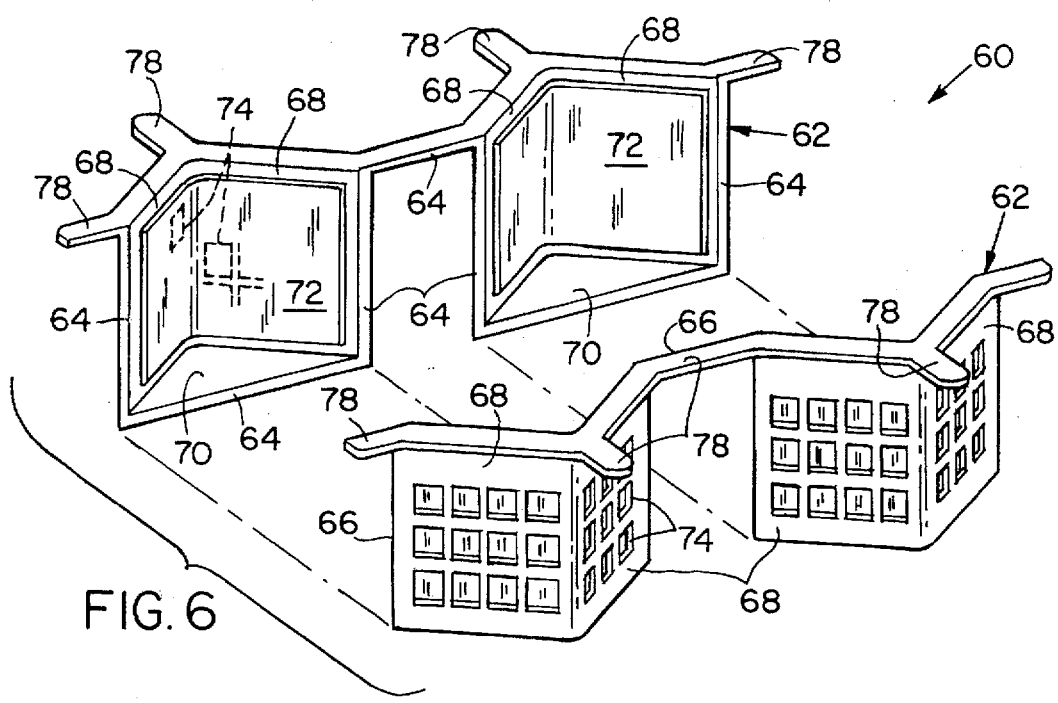
FIG. 6 is an exploded view of an alternative reservoir structure of this invention.

Referring to FIG. 6, an alternative multi-reservoir device 60 is shown with the identical reservoir sections 62 being separated. The multi-reservoir device 60 is formed by joining the reservoir sections 62 at surfaces 64 and 66. The reservoir sections 62 are formed from side walls 68 and bottom sections 70. Membranes 72 are sealed over holes 74 at the inside surfaces of side walls 68. Flanges 78 are provided in order to position the multi-reservoir device 60 within the wells of a multiwell plate (not shown).

Figure 7:
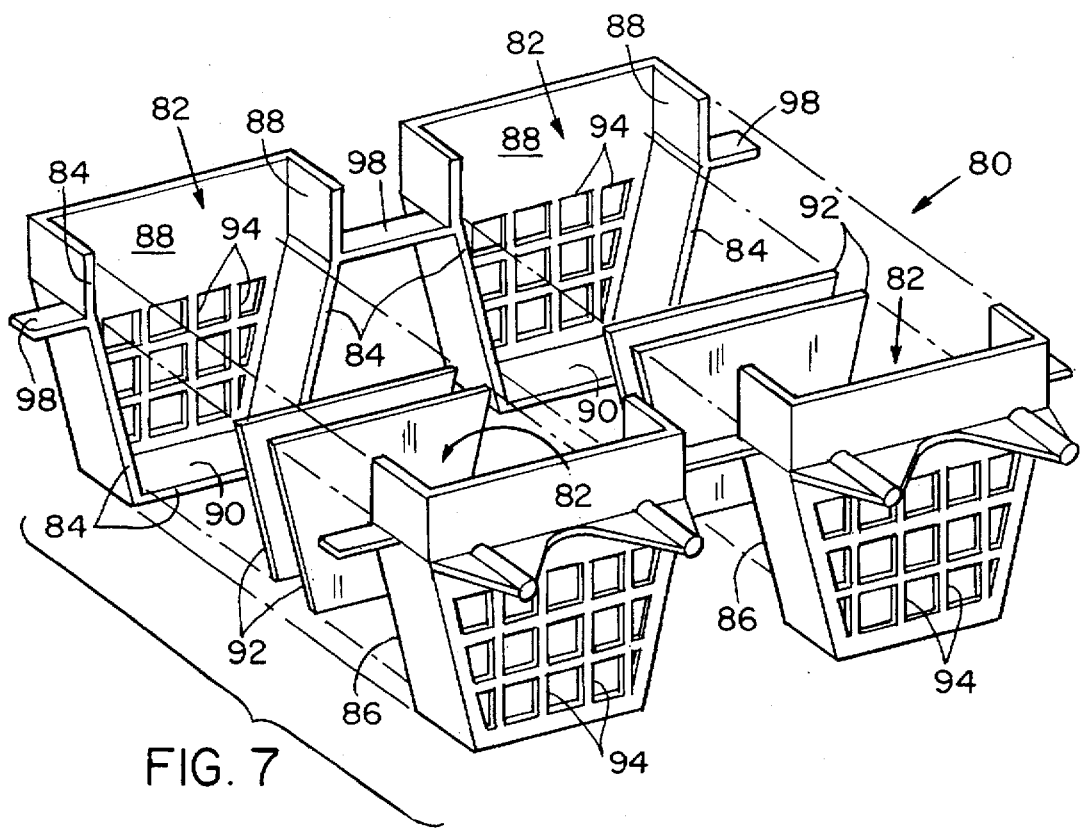
FIG. 7 is a cross-sectional view of an alternative reservoir structure of this invention.

Referring to FIG. 7, an alternative multi-reservoir device 80 is shown with the identical reservoir sections 82 being separated. The multi-reservoir device 80 is formed by joining the reservoir sections 82 at surfaces 84 and 86. The reservoir sections 82 are formed from side walls 88 and bottom sections 90. Membranes 92 are sealed over holes 94 at the inside surfaces of side walls 88. Flanges 98 are provided in order to position the multi-reservoir device 80 within the wells of a multiwell plate (not shown).

Figure 8:
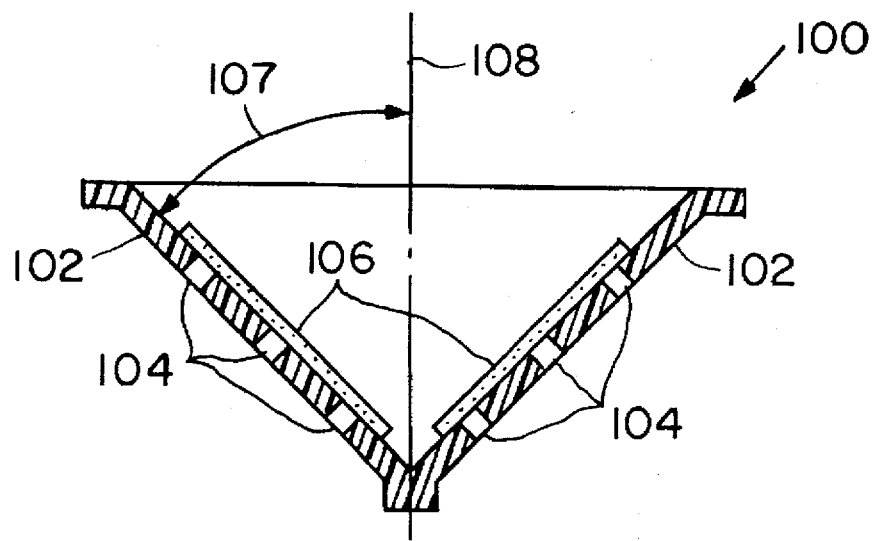
FIG. 8 is a cross-sectional view of an alternative structure of this invention having converging side walls which are joined together.

Referring to FIG. 8, an alternate device 100 is shown. The device 100 includes two converging side walls 102 each having holes 104 therein which are sealed by membranes 106. The angle 107 of the side walls 102 to the vertical axis 108 is between about 1 and 60 degrees.

Figure 9:
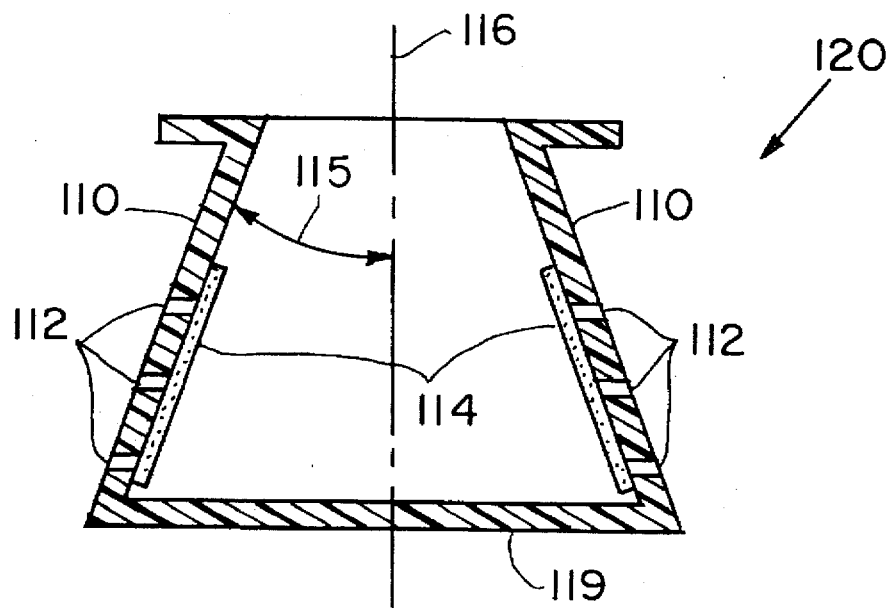
FIG. 9 is a cross-sectional view of an alternative reservoir structure of this invention having slightly diverging side walls.

Referring to FIG. 9, an alternative multiwell device 120 is shown including diverging side walls 110 each having holes 112 therein which are sealed by membranes 114. The angle 115 between the vertical axis 116 and the side walls 110 is between about 1 and 50 degrees. The device 120 has a closed bottom surface 119.

While the invention has been described with respect to preferred embodiments thereof, this is solely for the purpose of illustration as changes and modifications will become apparent to those of skill in the art. Accordingly, the invention is intended to be limited only by the scope of the appended claims.

We claim:

1. A multiwell filtration device for use with a multiwell receiver plate which comprises:

at least two liquid retaining reservoirs joined together, each of said reservoirs being formed with a plurality of side walls and having a closed bottom and an open top surface, each of said reservoirs having at least one opening through at least one side wall of each of said reservoirs for passage of liquid from within each of said reservoirs to a volume outside of each of said reservoirs, a filtration membrane covering said at least one opening of said at least one side wall of each of said reservoirs to effect sealing so that liquid passing from said reservoirs must pass through said membrane, said membrane being sealed to an inside surface of said at least one side wall and being supported by said side wall, and means for positioning said liquid reservoirs on a support.

2. The device of claim 1 wherein said side walls are converging and form an angle between about 1 and 60 degrees from a vertical axis passing through a bottom surface of said device.

3. The device of claim 1 wherein said side walls diverge and form an angle between about 1 and 50 degrees with a vertical axis passing through a bottom surface of said device.

4. The device of claim 1 wherein said side walls are normal to said bottom surface.

5. The device of claim 4 wherein two opposing said side walls have openings therethrough.

6. The device of claim 1 wherein said side walls are converging and form an angle between about 1 and 30 degrees from a vertical axis of said device.

7. The device of claim 6 wherein two opposing said side walls have openings therethrough.

8. The device of claim 1 wherein said side walls diverge and form an angle between about 1 and 50 degrees with a vertical axis of said device.

9. The device of claim 8 wherein two opposing said side walls have openings therethrough.

10. The device of claim 1 wherein two opposing said side walls have openings therethrough.

11. The device of any one of claims 1, 2, 3, 4, 6, 8, 10, 5, 7 or 9 wherein said side walls are planar.

12. The device of any one of claims 1, 2, 3, 4, 6, 8, 10, 5, 7 or 9 wherein said side walls are formed from wall sections which converge at an angle less than 180°.

13. The device of claim 1 including means for accessing filtrate from said volume outside said reservoirs.

14. The device of claim 13 wherein said means for accessing includes a flange attached to said side wall and said flange having an indentation.

15. A device suitable to effect liquid sample separation to form a filtrate and a retentate which comprises:
   a. the device of claim 13,
   b. a multiwell plate having a plurality of wells each having an open top surface and a closed bottom surface joined by side wall means,
   c. the reservoirs being sized to fit one of said reservoirs in one of said wells and,
   d. said means for positioning adapted to effect suspension of one reservoir in one of said wells while substantially preventing rotation of said reservoirs within said wells.

16. A device suitable to effect liquid sample separation to form a filtrate and a retentate which comprises:
   a. the device of claim 1,
   b. a multiwell plate having a plurality of wells each having an open top surface and a closed bottom surface joined by side wall means,
   c. the reservoirs being sized to fit one of said reservoirs in one of said wells and,
   d. said means for positioning adapted to effect suspension of one reservoir in one of said wells while substantially preventing rotation of said reservoirs within said wells.

17. The device of any one of claims 16 or 15 wherein said side walls are normal to said bottom surface.

18. The device of claim 17 wherein said two opposing side walls have openings therethrough.

19. The device of any one of claims 16 or 15 wherein said side walls are converging and form an angle between about 1 and 30 degrees from a vertical axis of said device.

20. The device of claim 19 wherein said two opposing side walls have openings therethrough.

21. The device of any one of claims 16 or 15 wherein two opposing side walls have openings therethrough.

22. The device of any one of claims 16 or 15 wherein said side walls are planar.

23. The device of any one of claims 16 or 15 wherein said side walls are formed from wall sections which converge at an angle less than 180°.

24. The device of any one of claims 1, 16 or 15 wherein said membrane is a microporous membrane.

25. The device of any one of claims 1, 16 or 15 wherein said membrane is an ultrafiltration membrane.

* * * * *